(12) United States Patent
Safran et al.

(10) Patent No.: US 7,481,055 B2
(45) Date of Patent: Jan. 27, 2009

(54) ROTARY ACTUATOR

(75) Inventors: Les Safran, Westlake, OH (US); Stephen L. Douglass, Newbury, OH (US)

(73) Assignee: Thermotion Corporation, Mentor, OH (US)

( * ) Notice: Subject to any disclaimer, the term of this patent is extended or adjusted under 35 U.S.C. 154(b) by 116 days.

(21) Appl. No.: 11/563,773

(22) Filed: Nov. 28, 2006

(65) Prior Publication Data

US 2008/0120977 A1 May 29, 2008

(51) Int. Cl.
*F01B 5/02* (2006.01)
*F01B 29/08* (2006.01)

(52) U.S. Cl. .......................................... 60/531; 60/513

(58) Field of Classification Search .................. 60/517, 60/531, 670; 92/31–33, 116, 117 R, 129, 92/165 PR; 74/99 R, 424.89, 424.9; 417/413.1
See application file for complete search history.

(56) References Cited

U.S. PATENT DOCUMENTS 3,585,868 A * 6/1971 Scott .......................... 74/424.9
3,841,165 A * 10/1974 Layfield et al. ................. 74/56
3,911,793 A * 10/1975 Izumi ............................. 92/33
4,759,189 A 7/1988 Stropkay et al.
4,887,429 A 12/1989 Birli, Sr. et al.
5,134,923 A * 8/1992 Wexler .......................... 92/31
5,203,171 A 4/1993 Petot et al.
6,186,015 B1 * 2/2001 Regueiro ................... 74/424.9

* cited by examiner

*Primary Examiner*—Thomas E Denion
*Assistant Examiner*—Jonathan Matthias
(74) *Attorney, Agent, or Firm*—Leydig, Voit & Mayer, Ltd.

(57) ABSTRACT

An electrothermal actuator producing linear and/or rotational movement includes a housing having a longitudinal axis. A chamber within the housing contains a working fluid that changes phase upon heating. A piston is slidably disposed within the housing and movable along the longitudinal axis between first and second positions. A spring biases the piston toward the first position. The piston slides from the first position to the second position in response to heating of the working fluid. The piston includes a piston rod extending along the longitudinal axis and protruding from the housing. The housing includes helical grooves on an interior surface and the piston includes partially spherical recesses. Balls captured between the grooves and recesses produce rotation of the piston and piston rod when the piston moves between the first and second positions.

9 Claims, 5 Drawing Sheets

ROTARY ACTUATOR

FIELD OF THE INVENTION

The present invention relates to actuators in which rotary and/or linear motion is produced in response to electrical power. The invention particularly relates to actuators having a piston rod that rotates and reciprocates during operation of the actuator.

BACKGROUND OF THE INVENTION

Actuators producing mechanical movement of an object in response to the application of electrical power are well known. Among the types of actuators that respond to the application of electrical power to produce mechanical motion are electrothermal actuators. Examples of such actuators are described in U.S. Pat. Nos. 4,759,189, 4,887,429, and 5,203,171, which are incorporated by reference. Within these electrothermal actuators, a closed chamber contains a working fluid. The working fluid is mostly a liquid at ambient temperature and changes phase to become a gas, when heated. That gas phase of the working fluid expands upon continued heating, increasing internal pressure within the chamber. (In the following description, the reference to the working fluid encompasses both of the liquid and gas phases of that fluid, the gas phase expanding upon heating to provide the motive force of the actuator.)

The chamber includes an electrically powered heater that supplies heat to the fluid, in response to an electrical current supplied to the heater. The heat produces the phase change in the working fluid and the pressure increase within the chamber. In response to the increased internal pressure in the chamber, a flexible rolling diaphragm, usually peripherally clamped to the package of the electrothermal actuator, is displaced. The diaphragm displacement pushes a piston that drives a piston rod in a linear direction or rotationally.

When electrical power is removed from the heater and pressure in the chamber decreases, the piston rod retracts or counter-rotates to the original position or orientation. Typically, an electrothermal actuator includes a return spring urging the piston to withdraw the piston rod into the package of the actuator or to return the piston rod to its original orientation, before rotation. The expansion of the working fluid provides a force that counteracts the restoring force of that return spring.

In previously known electrothermal actuators, the piston rod rotates or reciprocates, i.e., extends and retracts. Those actuators do not provide a piston rod for driving an external mechanical device with linear motion and/or rotary motion in response to electrical power applied to the actuator.

SUMMARY OF THE INVENTION

Accordingly, it is desirable to provide an actuator supplying mechanical movement to a mechanical device coupled to the piston rod of the actuator.

An actuator according to the invention includes a housing having a part with a generally cylindrical interior surface surrounding a longitudinal axis. The interior surface includes a plurality of helical grooves. A chamber within the housing contains a working fluid that changes phase upon heating. An electrical heater disposed within the chamber heats the working fluid upon application of electrical power to the electrical heater. A piston slidably disposed within the housing is movable along and rotatable about the longitudinal axis between first and second positions within the housing. The piston is driven and slides from the first position to the second position in response to heating of the working fluid by the electrical heater. The piston includes a body having a plurality of partially spherical recesses and a piston rod extending from the piston body in a direction opposite the chamber. The piston rod protrudes from and moves relative to the housing. Each of a plurality of balls is rotationally disposed in and captured between one of the helical grooves and one of the partially spherical recesses in the body of the piston. A spring biases the piston toward the first position. The piston rotates as it moves between the first and second positions because of the helical grooves, the balls, and the recesses. Therefore the piston rod moves both rotationally and longitudinally as the piston slides within the housing.

Elements may be included in the actuator to avoid the transmission of torsional forces from the piston to other elements of the actuator. Such an element, referred to here as a second piston may be interposed between the first or principal piston and the diaphragm, which moves upon expansion of the working fluid. This bearing prevents the twisting of the diaphragm. A thrust bearing may be interposed between the spring and the one of the housing and the first piston to prevent the transmission of torsion to the spring.

BRIEF DESCRIPTION OF THE DRAWING FIGURES

In all figures like elements are given the same reference numbers to avoid the necessity of duplicate description

DETAILED DESCRIPTION

Figure 1:
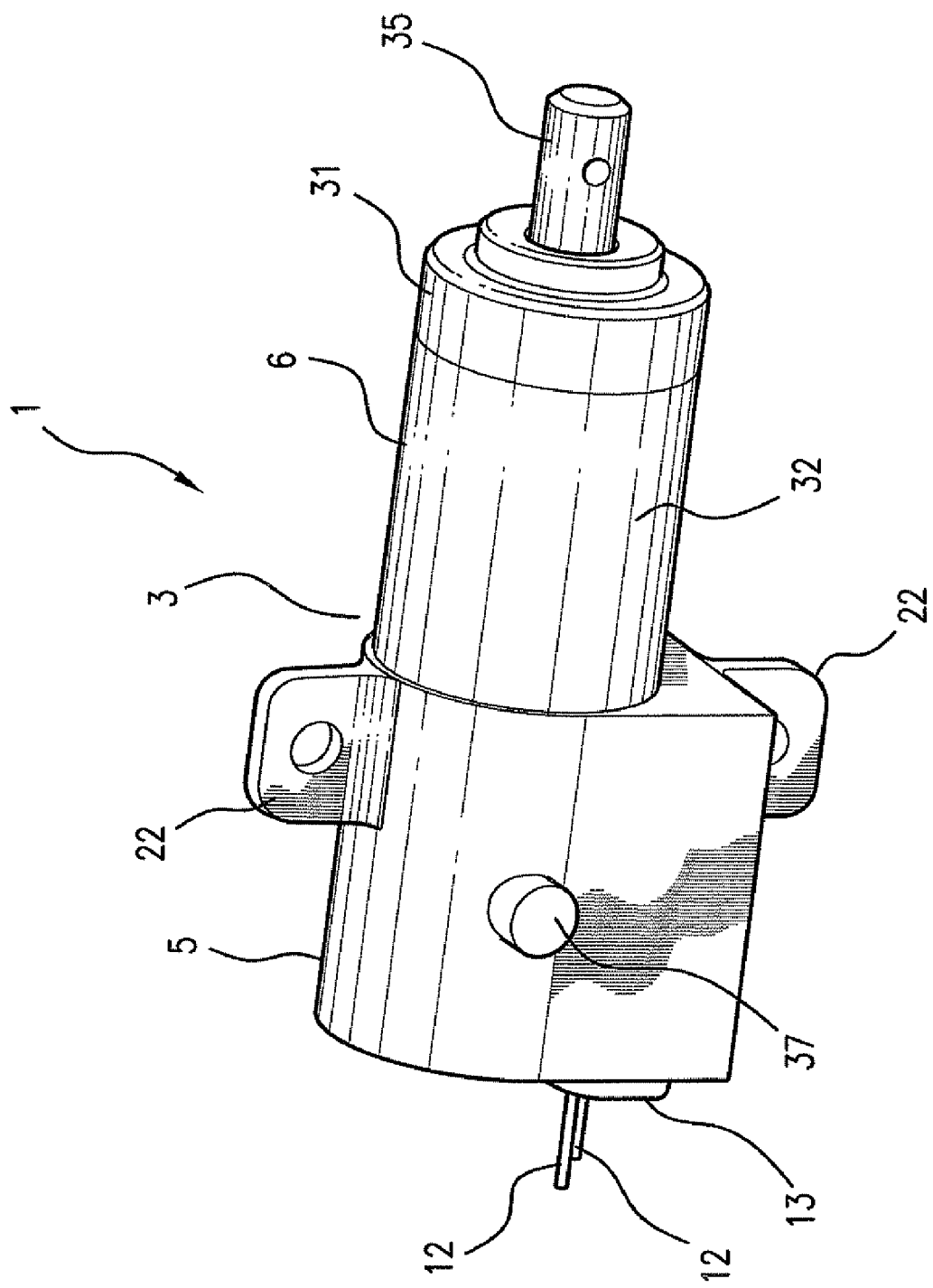
FIG. 1 is an exterior perspective view of an actuator according to a first embodiment of the invention.

FIGS. 1-5 show, in different views, an embodiment of an actuator 1 according to the invention. The actuator 1 includes a housing 3 including a rear housing part 5 and a front housing part 6. The front and rear housing parts 5 and 6 are preferably molded plastic parts that are bonded together, for example by ultrasonic welding. Of course, those parts could be metallic and joined by any conventional process. When the housing parts are made of plastic, the plastic must be able to withstand the maximum temperature of the heater and the working fluid.

The rear housing part 5 includes a chamber 10 (see FIGS. 3 and 4) that contains the working fluid, frequently a fluorocarbon. The chamber also houses an electrical heater 11, shown in the form of a disk, with electrical leads 12 that pass through a plug 13 that closes a hole in the rear housing part 5. Preferably, the plug 13 is plastic and is ultrasonically welded to the surfaces of the rear housing part that define the opening filled by the plug. The plug 13 may include a fill-hole for injecting the working fluid into the chamber 10. Where such a fill-hole is present, the fill-hole is closed after injecting the working fluid, for example, by a screw 14 seen in FIGS. 3 and 4. The chamber 10 may be sealed by other techniques, such as the plugging of a fill-hole and filling electrical feedthroughs with a potting compound. Most preferably, the heater 11 is a positive temperature coefficient heater that increases in resistance with an increase in temperature, self-regulating the maximum temperature that the heater reaches for a particular voltage applied across the heater leads 12.

A forward wall of the chamber 10 is defined by a rolling diaphragm 20 (see FIGS. 2-4) that has, as shown in FIGS. 2-5, a top hat or a pilgrim hat shape. That diaphragm, which is a single piece of elastomeric or other flexible material, includes a peripheral flange 21, corresponding to the brim of the hat shape. That peripheral flange 21 is preferably clamped between the rear and front housing parts 5 and 6. A generally tubular portion of the rolling diaphragm extends from the flange 21 to a top part of the top hat shape of the rolling diaphragm. The top part has first side that faces the working fluid within the chamber 10 and an opposite, second side that engages a first piston 30 which is described further below. In the illustrated embodiment of the invention, the rear housing part 5 includes two external mounting flanges 22 that extend in diametrically opposite directions from the external surface of the rear housing part. These mounting flanges 22 include holes for mounting the actuator with fasteners or on corresponding posts received within the holes of the mounting flanges.

The front housing part 6 includes two parts, a cap 31 and a tube 32. The cap 31 engages and closes one end of the slotted tube 32. In the illustrated embodiment, the cap 31 is generally circular and includes a centrally located hole 33. These parts, the cap 31 and the tube 32, are preferably molded plastic and the parts are preferably ultrasonically welded together. However, other bonding techniques and materials can be employed in embodiments of the invention. An end of the tube 32 opposite the cap 31 is preferably received within and is bonded to the rear housing part 5, clamping the peripheral flange 21 of the diaphragm 20.

Figure 2:
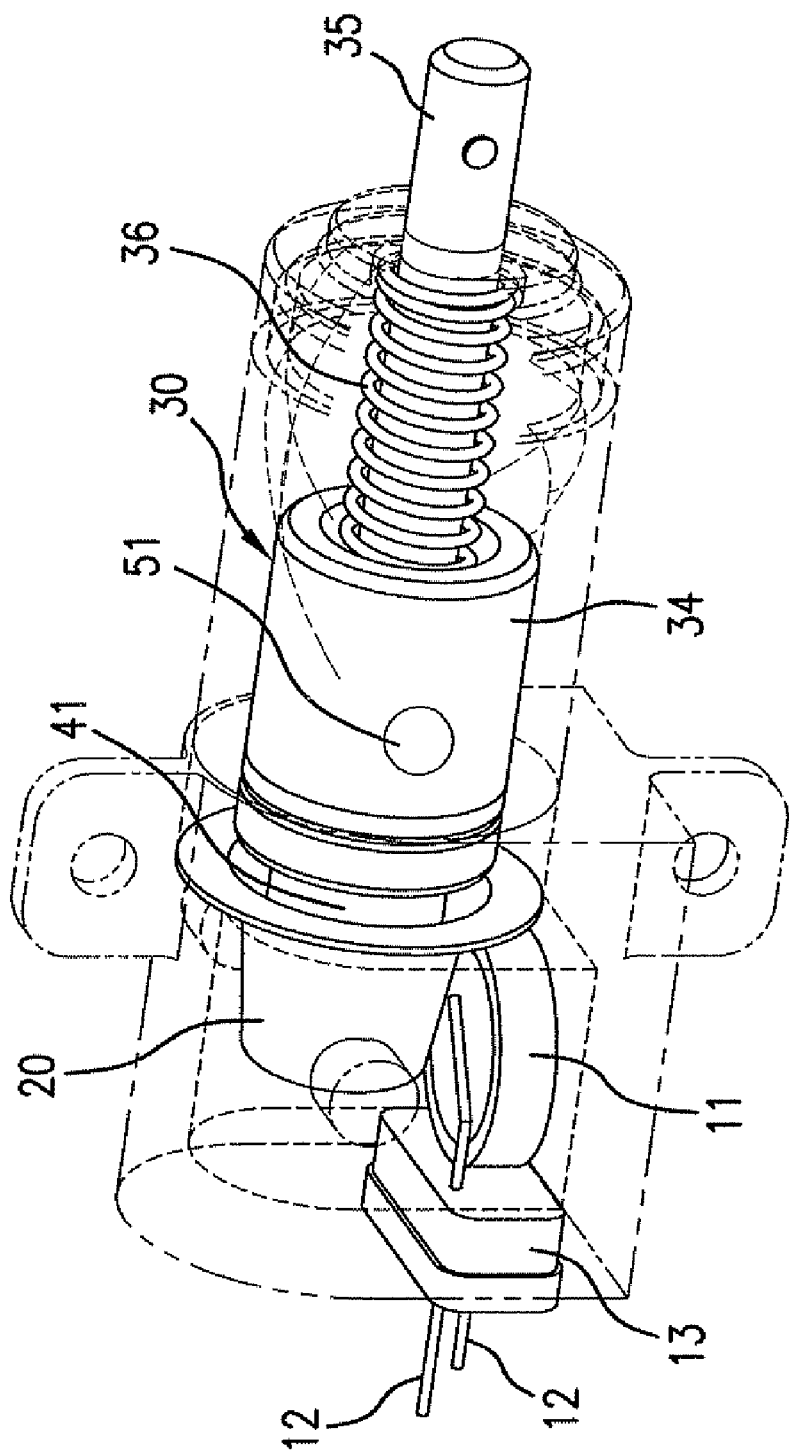
FIG. 2 is a perspective view of the actuator embodiment of FIG. 1 with the housing shown as transparent.
Figure 3:
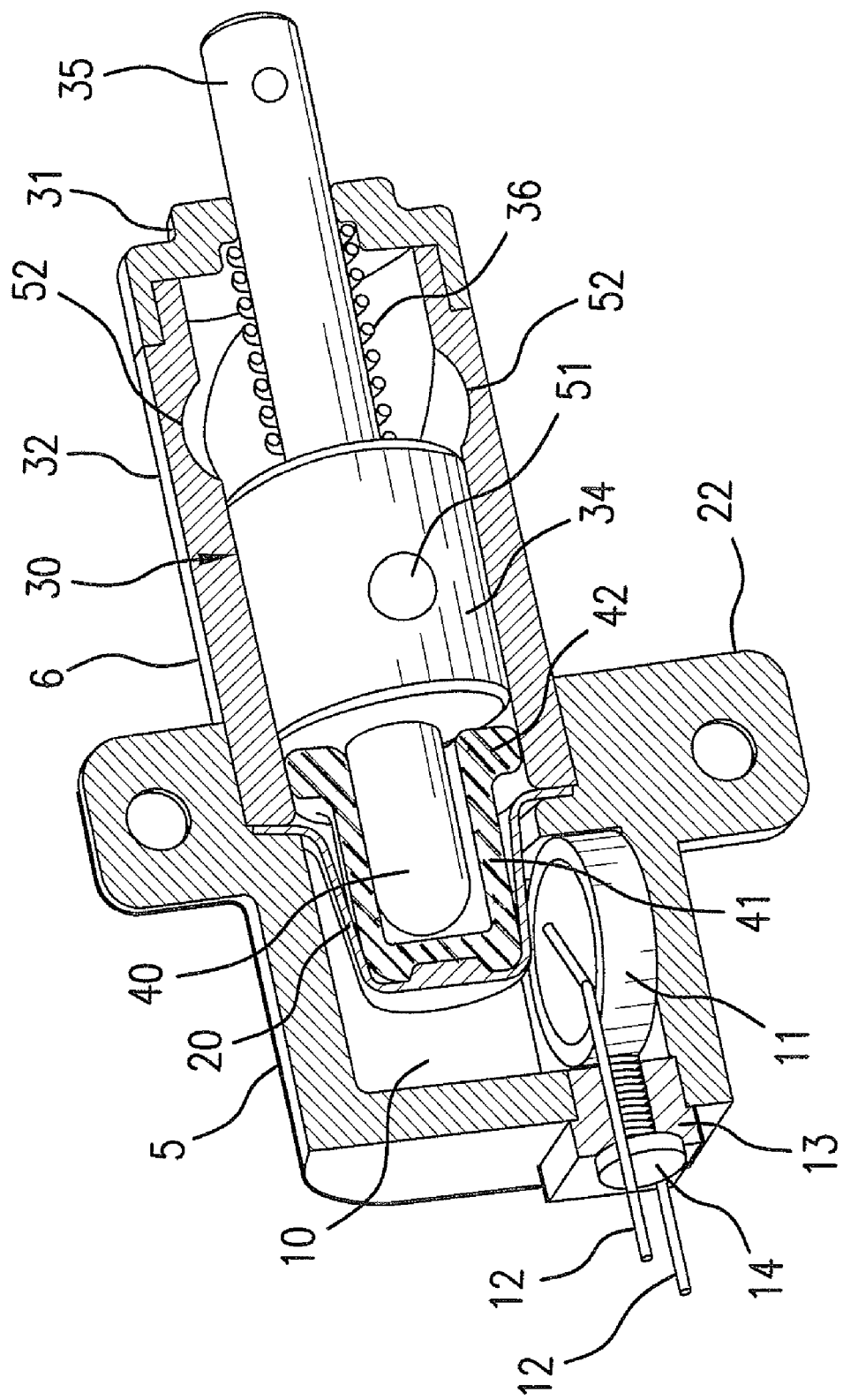
FIG. 3 is a cross-sectional view of the actuator embodiment of FIG. 1 taken along a plane including the longitudinal axis of the actuator in which the piston, piston rod, and bearing pin are not sectioned.
Figure 4:
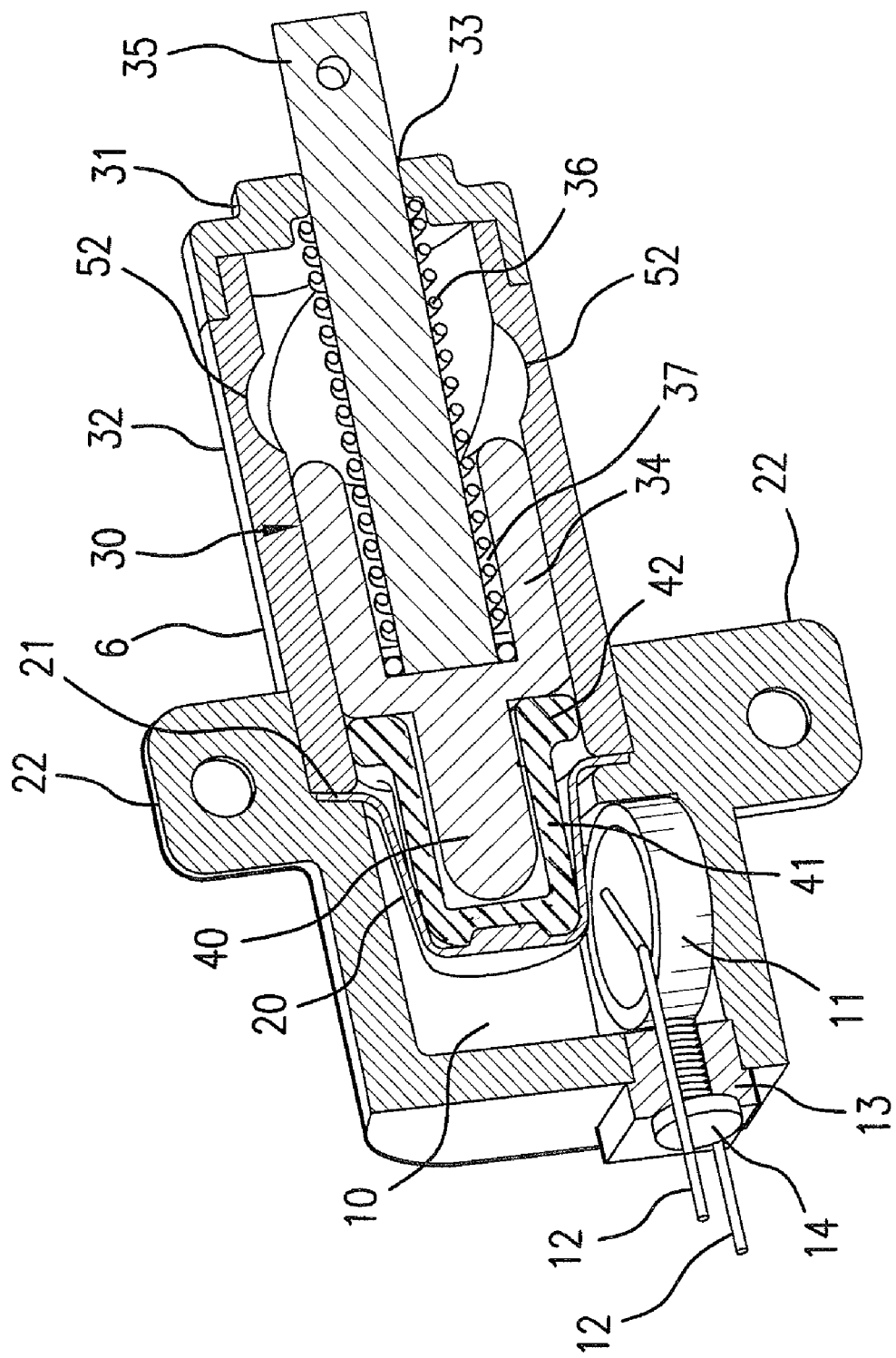
FIG. 4 is a cross-sectional view of the actuator embodiment of FIG. 1 taken along a plane including the longitudinal axis of the actuator.

The tube 32 has a generally cylindrical interior surface which has a central longitudinal axis. The hole 33 in the cap 31 is aligned along that axis. A first piston 30 is slidably disposed within the tube 32 and can move from a first position, maximally intruding into the chamber 10 as illustrated in FIGS. 2-4, to a second position, not illustrated, in which the first piston is much closer to the cap 311. This sliding movement occurs along the longitudinal axis of the tube 32.

To facilitate the sliding, the first piston 30 preferably has a central piston body 34 with a circular cross-section and an outside diameter similar in size to the internal diameter part of the tube 32. The first piston 30 includes a piston rod 35 extending outwardly from the piston body 34, aligned with the longitudinal axis of the tube 32, and extending through the hole 33 of the cap 31. As shown in FIGS. 2-4, the first piston 30 is fully retracted into the actuator and, in that first position of the first piston 30, an end of the piston rod 35 protrudes outside the housing of the actuator. As described below, when the first piston 30 moves to the second position, with the piston body 34 closer to the cap 31, the piston rod 35 protrudes much further from the housing of the actuator than shown in FIGS. 2-4. The protruding end of the piston rod 35 includes a hole transverse to the longitudinal axis for assistance in coupling to an external mechanical device driven by the actuator. That hole is only exemplary of various coupling arrangements including slots, external threads, a hole along the longitudinal axis that is internally threaded, rifled, or smooth, and similar mechanical engagement structures.

A spring 36 surrounds the piston rod 35 within the tube 32. The spring 36 bears on the cap 31 and the piston body 34, urging the first piston 30 towards the first position illustrated in FIGS. 2-4, i.e., with the piston rod retracted. Most preferably, the piston body 34 includes an annular recess 37 where the piston rod 35 joins the piston body 34 and in which an end of the spring 36 is received. The annular recess 37 captures the end of the spring and maintains the desired alignment of the spring.

A bearing pin 40 extends along the longitudinal axis from the end of the piston body 34 opposite the piston rod 35. Preferably, the bearing pin 40 includes an end that is spherical or rounded. The bearing pin 40 is received within a second piston 41 having a generally tubular shape with a closed end and an annular flange 42 surrounding an open end. The bearing pin 40 is inserted into the second piston 41 through that opening at the flange 42. The second piston 41 is interposed between the bearing pin 40 of the first piston and the diaphragm 20. The second piston 41 is preferably made of a plastic material with a relatively low coefficient of friction with respect to the material of the bearing pin 40. The bearing pin 40 may rotate about the longitudinal axis within the tubular portion of the second piston 41 while the second portion 41 remains rotationally stationary. Preferably, the top part of the diaphragm 20 includes a thickened part that is received in a complementary recess in the closed end of the second piston 41 to aid in maintaining engagement and alignment of the second piston 41.

An important feature of the invention is the rotational movement imparted to the piston rod 34 when the first piston 30 moves between the first and second positions. In the depicted embodiment this rotational movement is produced by a combination of helical grooves on the interior surface of the tube 32 and ball bearings disposed within the grooves and partially spherical recesses of the piston body 34. The embodiment described includes two such grooves and corresponding balls and partially spherical recesses. However, the invention encompasses actuators with a larger number of grooves and ball bearings.

Figure 5:
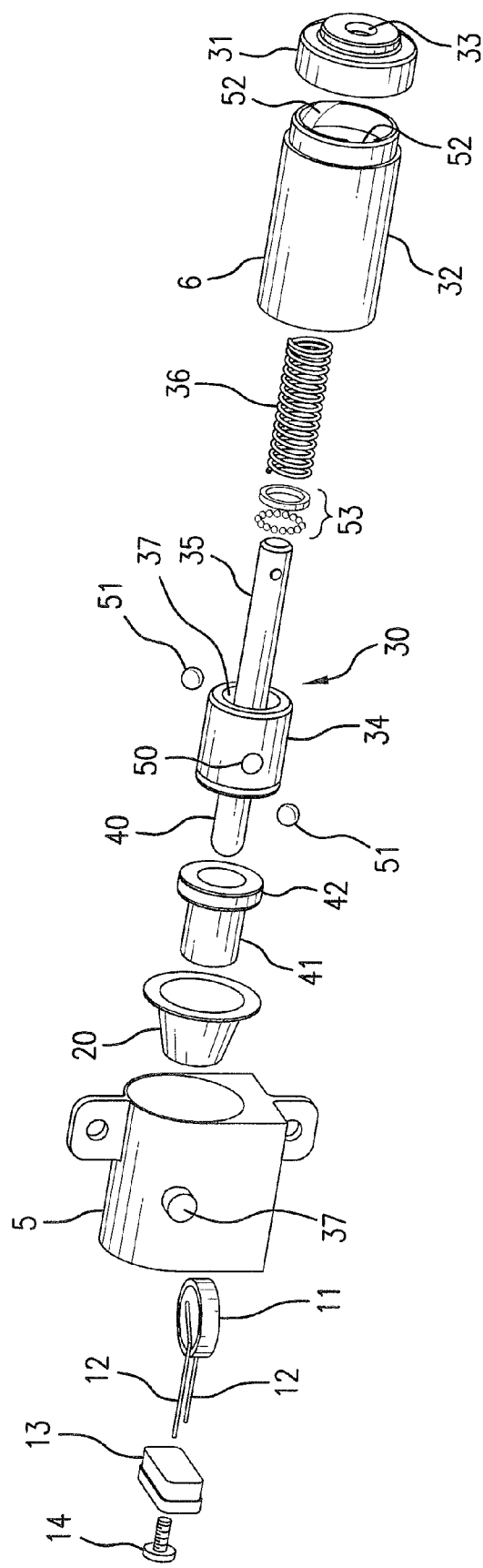
FIG. 5 is an exploded view of the actuator embodiment of FIG. 1.

As best seen in FIG. 5, the piston body 34 includes, in the depicted embodiment, two partially spherical recesses 50. Only one of those recesses is visible in FIG. 5. A corresponding ball 51 is received in each of the partially spherical recesses 50. Each ball protrudes from the outer surface of the piston body 34 as seen in FIGS. 2 and 3. The balls 51 are also received in helical grooves 52 in the interior surface of the tube 32 in the grooves. The balls are captured between the piston body 34 and the tube 32 in the grooves 52. Most preferably, the grooves extend to an end of the tube 32, either adjacent the cap 31 or the rear housing part 5, for ease in assembly of the actuator. The grooves 52 are referred to here as helical because they lie along respective parts of the trace of a helix or helices on the interior surface of the tube 32. The pitch of the helical grooves 52 and the distance between the first and second positions of the first piston 30 measured along the longitudinal axis determine the degree of rotation of the piston rod 35 as the first piston 30 moves between those two positions.

In the initial, unactuated state of the actuator, the spring 36 urges the first piston 30 toward the chamber 10. When electrical power is applied through the leads 12 to the heater 11, the working fluid within the chamber is heated, the fluid changes phase from a liquid to a gas, and pressure within the chamber increases. When the pressure increases sufficiently so that the force applied to the first piston 30, through the bearing pin 40 covered by the diaphragm 20 and second piston 41, exceeds the force applied to the first piston 30 by the spring 36, the first piston 30 slides within the tube 32 toward the cap 31. The movement of the first piston 30 is guided by the balls 51 that are captured in and between the grooves 52 and the partially spherical recesses 50. The external mechanical device coupled to the piston rod 35 is thus moved longitudinally and/or rotationally, depending upon how the external mechanical device is coupled to the piston rod 35.

When power is no longer supplied to the heater II through the leads 12, the working fluid within the chamber 10 cools and returns to the liquid phase, reducing pressure within the chamber 10. Under the influence of the spring 36, the first piston 30 counter-rotates, slides toward the chamber 10, and is restored to the first position.

The rotational movement of the first piston during the translational movement can transmit torsional forces to other elements within the actuator. To avoid the transmission of torsion to the diaphragm 20, the second piston 41 is interposed between the diaphragm 20 and the bearing pin 40 of the first piston 30. When the bearing pin 40 rotates, the rotation occurs within the second piston 41 so that the diaphragm 20 is not damaged by application of repeated cycles of alternative, oppositely directed torsional forces. Since the tubular part of the second piston 41 that receives the bearing pin 40 is closed at the end contacting the diaphragm 20, no part of the bearing pin 40 comes into contact with the diaphragm 20. The second piston 41 permits and facilitates rotation of the first piston 30 through the limited contact between the rounded end of the bearing pin 40 and the wall at the end of the tubular part of the second piston 41.

A thrust bearing 53 may be placed within the recess 37 of the body 34 of the piston to engage an end of the spring 36. The thrust bearing includes captured ball bearings and an adjacent washer or race that permits free rotation of the washer with respect to the ball bearings. Therefore, the spring 36 does not experience torsional stresses as the piston rotates clockwise and counterclockwise about the longitudinal axis in moving between the first and second positions. The positioning of the thrust bearing 53 is not limited to a location within the piston recess 37 of the body 34. The thrust bearing 53 can also be mounted on the cap 31, between the cap and the end of the spring 36 adjacent the cap. In the former case the spring does not rotate with the first piston and, in the latter case, the spring does rotate with the first piston. However, in both instances, transmission of torsion to the spring 36 is reduced or prevented. While either location is sufficient to relieve torsional stresses on the spring, the location next to the cap 31 is less desirable because the stroke of the first piston may be shortened by the thickness of the thrust bearing. As a further, more complex and expensive option, still another thrust bearing could be employed if the first piston 30 includes two parts, for example, if the bearing pin 40 were separate from but received within the body of the first piston 30.

Numerous variations of the actuator are readily apparent to those of ordinary skill in the art. The tube 32, while most preferably received within the rear housing part 5 to clamp the peripheral flange 21 of the diaphragm 20 reliably, might simply abut an external surface of the rear housing part 5. As shown in FIGS. 1 and 5, the rear housing part 5 may include integrally molded posts 37 for assistance in mounting, alignment, and/or manufacture of the actuator.

The foregoing description pertains to particular, preferred embodiments of the invention. However, this description is not intended to limit the invention to the particular embodiments illustrated and described. The scope of the invention is defined solely by the following claims.

We claim:

1. An actuator comprising:
    a housing having a part with a generally cylindrical interior surface surrounding a longitudinal axis and including a plurality of helical grooves;
    a chamber within the housing and containing a working fluid that changes phase upon heating;
    an electrical heater disposed within the chamber for heating the working fluid upon application of electrical power to the electrical heater;
    a first piston slidably disposed within the housing and movable along and rotatable about the longitudinal axis between first and second positions;
    a rolling diaphragm, separating the chamber from the first piston, driven by the working fluid, and sliding the first piston toward the second position upon expansion of the working fluid, wherein
        the first piston is driven and slides from the first position to the second position in response to heating of the working fluid by the electrical heater, and
        the first piston includes a piston body having a plurality of partially spherical recesses;
    a piston rod extending from the piston body in a direction opposite the chamber and protruding from and moving relative to the housing;
    a plurality of balls, each ball being rotationally disposed in and captured between one of the helical grooves and one of the partially spherical recesses;
    a spring biasing the first piston toward the first; and
    a second piston interposed between the first piston and the rolling diaphragm, inhibiting transmission of torsion to the rolling diaphragm.

2. The actuator according to claim 1 wherein the rolling diaphragm has a peripheral flange clamped by the housing.

3. The actuator according to claim 1, wherein the part of the housing comprises a tubular portion and a cap mounted on one end of the tubular portion and including a central opening through which the piston rod protrudes from the housing.

4. The actuator according to claim 3, wherein the spring surrounds the piston rod between the first piston and the cap.

5. The actuator according to claim 1, wherein the piston body includes a recess adjacent the piston rod and that receives an end of the spring.

6. The actuator according to claim 1, including a thrust bearing interposed between the first piston and the spring and preventing transmission of torsion to the spring.

7. The actuator according to claim 1, wherein the first piston includes a bearing pin extending toward the chamber and the second piston includes a tubular portion having a closed end contacting the rolling diaphragm and the bearing pin.

8. The actuator according to claim 7, wherein the bearing pin has a rounded end contacting the closed end of the second piston.

9. The actuator according to claim 1 including two of the helical grooves, two of the balls, and two of the partially spherical recesses, wherein the two partially spherical recesses are located in the piston body at diametrically opposite positions, and the two balls are located between and captured in respective grooves and partially spherical recesses.

* * * * *